2,891,811

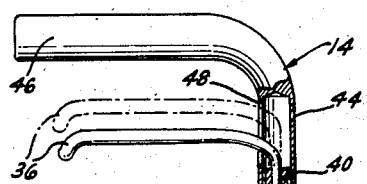
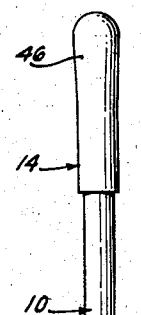
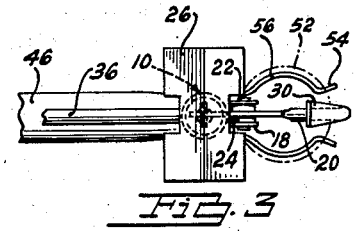
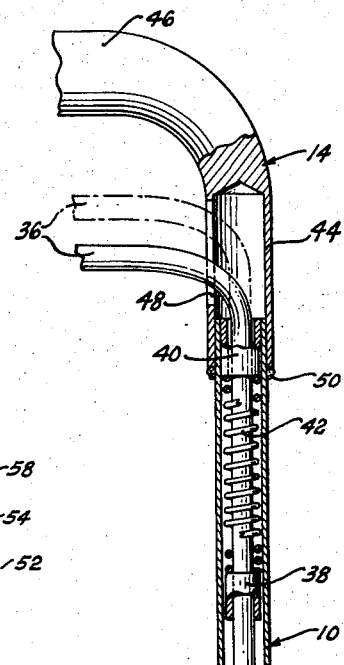
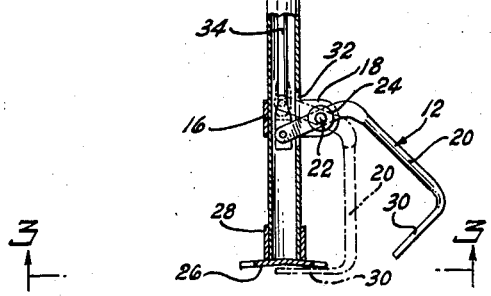
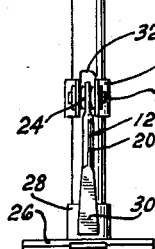
June 23, 1959     M. A. STRICKLER     2,891,811
BAIT CATCHER
Filed Oct. 20, 1955
INVENTOR.
MORRIS A. STRICKLER
BY
ATTORNEY

United States Patent Office 2,891,811
Patented June 23, 1959

BAIT CATCHER

Morris A. Strickler, Detroit, Mich.

Application October 20, 1955, Serial No. 541,578

1 Claim. (Cl. 294—19)

My instant invention relates generally to fishing tackle for sportsmen and more particularly to a novel apparatus for catching fishing bait, such as night crawlers and the like.

My invention may be used and operated manually with one hand thereby leaving the other hand free to carry a suitable bait receptacle. Further, my invention eliminates the drudgery, the inconvenience and the disagreeable nature of bait hunting and greatly adds to the enjoyment of the sport of fishing.

According to a principal feature of my invention, I have provided a lever mechanism having a tube-like body portion with a bait clamping device mounted at the lower end of the body portion and with a hand-operated mechanism situated at the upper end thereof for actuating the clamping device. Mechanical coupling means are provided for operatively connecting the hand-operated mechanism and the clamping device to facilitate manual actuation of the latter.

The provision of a bait catcher of the type above mentioned being a principal object of my invention, it is a further object to provide a bait catcher which may be conveniently operated and which is capable of being stored when not in use in a conventional tackle box.

It is a further object of my invention to provide a bait catcher of the type above mentioned which is capable of being used to catch fishing bait or the like without destroying or injuring the same.

A further object of my invention resides in the provision of a bait catcher with a bait clamping mechanism at one end thereof and with a spring loaded quick release means associated therewith to facilitate removal of the bait without the necessity of handling the same.

It is a further object of my invention to provide a bait catcher for catching fishing bait or the like which will eliminate the need for stooping and bending while seeking the bait.

It is a further object to provide a bait catcher which is comprised of simple leverage elements and which may be manufactured in quantity with a minimum of cost.

Other objects and advantages will readily become apparent from the following description and from the accompanying drawings wherein:

Figure 1 is a side elevation view partly in section of the complete bait catcher assembly showing in particular detail the bait clamping portion of the manually operable portion;

Figure 2 is an elevational view as viewed perpendicularly to the view of Figure 1;

Figure 3 is a bottom view of the structure shown in Figure 1 as viewed from the plane of the section line 3—3 of Figure 1; and Figure 4 is a detail cross sectional view of the upper portion of the bait catcher showing the details of the construction of the manually operable mechanism.

Having reference first to Figure 1, the bait catcher is comprised principally of a tubular body generally designated by numeral 10, a clamping mechanism generally designated by the numeral 12, and a handle portion generally designated by numeral 14. The tubular body 10 may be formed of any length as desired, and a bracket is secured to the lower end thereof as indicated at 16 to facilitate the mounting of the clamping mechanism 12. The bracket 16 encircles the lower end of the body 10 and each of the ends thereof extend transversely of the axis of the body 10 as indicated at 18. A clamping lever 20 is pivotally mounted on the bracket 16 by means of a pivot pin 22 extending transversely through aligned openings in the bracket extensions 18. Spacer washers 24 may be provided for eliminating interference between the clamping lever 20 and the bracket 16.

The base of the body 10 carries thereon a clamping plate or foot 26, said plate 26 being joined to a sleeve 28 which may in turn be received over the end of the body 10. By preference the plate 26 is slightly angular in shape to provide a recessed center for reasons which will later become apparent.

The clamping lever 20 is formed with a flattened terminal portion 30 substantially forming a right angle with the main section of the lever 20, and as the latter is pivoted about the pivot pin 22, the terminal portion 30 overlaps the end of the body 10 in juxtaposed relationship with respect to the foot 26. This latter position is shown by means of dotted lines in Figure 1.

The other end of the clamping lever 20 extends within the tubular body 10 through a longitudinal slot shown in Figure 1 at 32 and this inner end is pivotally connected to an actuator rod 34 extending longitudinally through the tubular body 10.

The rod 34 extends substantially the entire length of the tubular body 10 and it projects from the upper end thereof as indicated at 36. A bushing 38 is carried by the rod 34 within the tubular body 10 in the vicinity of the upper end of the assembly, said bushing being capable of sliding in an axial direction together with the rod 34. Another bushing 40 is fixed within the upper end of the tubular body 10 and the rod 34 is slidably received therethrough. A compression spring 42 is interposed between the bushings 38 and 40 for the purpose of normally biasing the rod 34 in a downward direction as viewed in Figure 1.

The handle 14 is comprised of an external sleeve section 44 and a hand-gripping portion 46, the latter extending perpendicularly to the sleeve portion 44. A longitudinal slot 48 is formed in the tubular section 44 of the handle 14 and the sleeve section 44 is received over the upper end of the tubular body 10 as indicated. The extension 36 of the rod 34 extends through the longitudinal slot 48 in a direction substantially parallel to the handle 46. The sleeve section 44 may be permanently secured to the tubular body 10 by means of welding or brazing or by any other suitable operation as indicated at 50.

If desired, a flashlight 52 may be fixed to the intermediate section of the tubular body 10 by means of a bracket 54 as indicated in Figures 1 and 2. The bracket 54 may be comprised of a pair of clamping members 56 and 58 which may encircle the tubular body 10 and the flashlight 52 at spaced locations and which may be bolted together at an intermediate point by a suitable clamping bolt 60.

In operation the operator may grip the handle portion 14 to carry the assembly while seeking bait specimens. The extension 36 of the actuating rod 34 is positioned so that it may be conveniently gripped by the fingers of the operator to cause the rod 34 to reciprocate within the tubular body 10. As the rod 34 moves in an upward direction it will be appparent that the clamping lever 20 will pivot in a clockwise direction as viewed in Figure 1, and the terminal portion 30 of the clamping lever 20 will overlie the clamping plate or foot 26. When the night crawler or angle worm is sighted by the operator, the clamping plate 26 may be maneuvered over the worm thereby pinning the same to the ground, and the actuator rod 34 may then be moved in an upward direction causing the clamping lever 20 to pin the worm to the plate 26. The depression in the plate 26 will prevent the clamping member 20 from damaging the worm. The worm may then be placed over a suitable receptacle and the operator's grip may be relieved thereby allowing the tension of the spring 42 to move the actuator rod 34 in a downward direction. This causes the clamping lever 20 to release the worm while simultaneously positioning the lever for the next operation.

The flashlight 52 may be employed when seeking bait at night to attract the bait and it is positioned so as to illuminate the clamping mechanism.

Having thus particularly described the principal features of one preferred embodiment of my invention, what I claim and desire to secure by United States Letters Patent is:

A bait catcher comprising a hollow tube, a clamping foot situated on one end of said tube, a clamping lever pivotally mounted intermediate its ends on said tube near said foot with one end thereof adapted to overlap said foot upon pivotal movement thereof in one direction, said foot comprising a ground engaging element in the form of a plate, two opposed sides of said plate being adapted to engage the ground and being situated in a plane spaced from the intermediate portion of said plate to define a concave surface, said foot and said one lever end being adapted to retain a bait specimen therebetween without causing damage to the same, a bracket carried by said tube near said foot, said lever comprising a first portion pivotally connected externally of said tube on said bracket, a longitudinal slot formed in said tube, said first lever portion extending through said slot into said tube, a rod extending through said tube, said rod being connected to said first lever portion, a second lever portion integrally joined to said first lever portion at an angle relative thereto, said second lever portion being adapted to move about the pivotal connection between said first lever portion and said bracket to a position in which it is substantially parallel to said tube, a third lever portion disposed substantially at a right angle relative to said second lever portion and terminating at said one lever end, said third lever portion being disposed transversely to said sides of said plate, a handle formed on the other end of said tube, and trigger means located at said other tube end for manually moving said rod to actuate said lever, one of said opposed sides of said plate having a recess formed thereon and said third lever portion being adapted to enter the space defined by said recess to facilitate an overlapping movement of said one lever end relative to said foot.

References Cited in the file of this patent
UNITED STATES PATENTS

| | | |
|---|---|---|
| 66,492 | Hellen | July 9, 1867 |
| 1,337,398 | Fleckner | Apr. 20, 1920 |
| 1,591,354 | Baillie | July 6, 1926 |
| 1,694,525 | Bloemsma | Dec. 11, 1928 |
| 1,731,691 | Webb | Oct. 15, 1929 |
| 1,919,396 | Sadler | July 25, 1933 |
| 2,125,214 | Apfel et al. | July 26, 1938 |
| 2,167,599 | Yantis | July 25, 1939 |
| 2,346,038 | Mason | Apr. 4, 1944 |
| 2,575,561 | Payne | Nov. 20, 1951 |